US007418308B2

(12) United States Patent  (10) Patent No.: US 7,418,308 B2
Allan et al.  (45) Date of Patent: Aug. 26, 2008

(54) METHOD OF OPTIMIZING GLASS STRAIN (75) Inventors: Douglas C. Allan, Corning, NY (US); Motoya Anma, Tokyo (JP); Josef C. Lapp, Corning, NY (US)

(73) Assignee: Corning Incorporated, Corning, NY (US)

( * ) Notice: Subject to any disclaimer, the term of this patent is extended or adjusted under 35 U.S.C. 154(b) by 98 days.

(21) Appl. No.: 10/699,591

(22) Filed: Oct. 31, 2003

(65) Prior Publication Data

US 2005/0096777 A1    May 5, 2005

(51) Int. Cl.
*G06F 19/00* (2006.01)
*C03B 37/07* (2006.01)

(52) U.S. Cl. .................................. 700/157; 65/377
(58) Field of Classification Search ................. 700/157; 65/377, 385, 484, 485, 29.1, 29.11, 29.12
See application file for complete search history.

(56) References Cited

U.S. PATENT DOCUMENTS

| | | | | | |
|---|---|---|---|---|---|
| 4,566,893 | A | * | 1/1986 | Hopkins et al. | 65/69 |
| 5,597,395 | A | * | 1/1997 | Bocko et al. | 65/33.4 |
| 5,837,026 | A | * | 11/1998 | Sugawara et al. | 65/66 |
| 6,304,383 | B1 | * | 10/2001 | DeBoynton et al. | 359/579 |
| 6,810,688 | B1 | * | 11/2004 | Duisit et al. | 65/30.13 |
| 2002/0053221 | A1 | * | 5/2002 | Grossman et al. | 65/32.1 |
| 2002/0151426 | A1 | * | 10/2002 | Murata et al. | 501/66 |

FOREIGN PATENT DOCUMENTS

EP    1114802 A2    11/2001

OTHER PUBLICATIONS

"Stress relaxation of a soda lime silicate glass below the glass transition temperature," Junwu Shen, et al, Journal of Non-Crystalline Solids 324 (2003) 277-288.

Walter M. Buehl and William P. Ryszytiwskyi; "Thermal Compaction Modeling of Corning Code 7059 Fusion Drawn Glass"; 1991 SID International Symposium, Seminar & Exhibition in Anaheim, California.

O.S. Narayanaswamy; "Stress and Structural Relaxation in Tempering Glass"; Journal of The American Ceramic Society, vol. 61, 146-152 (1978).

O.S. Narayanaswamy and Robert Gardon; "Calculation of Residual Stresses in Glass"; Journal of the American Ceramic Society, vol. 52, 554-558 (1969).

* cited by examiner

*Primary Examiner*—Zoila E Cabrera
(74) *Attorney, Agent, or Firm*—Kevin M. Able (57) ABSTRACT

A method of determining parameters of plurality of thermal cycles to achieve a set glass strain level includes providing a plurality of input parameters for a glass substrate and a plurality of parameters for a plurality of thermal cycles. The method also includes iteratively modifying at least one of the pluralities of thermal cycle parameters so the glass strain is not greater than the set glass strain level after a final thermal cycle is completed. An aspect of the method usefully enables a user to determine from the material parameters and processing sequences of the glass manufacturer and further entities that may further process the glass (e.g., the glass manufacturer's customers) whether a particular glass strain can be achieved; and if not the example embodiments allows the manufacturer to calculate changes in the customers' processes to meet the desired glass strain.

9 Claims, 9 Drawing Sheets

METHOD OF OPTIMIZING GLASS STRAIN

BACKGROUND

Often in display devices, it is useful to incorporate electronic components onto the glass substrate used in the display device. This is the case in liquid crystal display (LCD) devices. In LCD devices, a layer of liquid crystal material is modulated by voltages, which are generated by transistor arrays. Often, the transistors are thin-film transistors (TFT), and are complementary metal oxide semiconductor (CMOS) devices.

The LCD displays often comprise a glass substrate with the transistors formed over the glass substrate, and beneath a layer of LC material. The transistors are arranged in a patterned array, and are driven by peripheral circuitry to provide to switch on desired voltages to orient the molecules of the LC material in the desired manner.

The transistors of the display are often formed from a semiconductor material disposed directly on or over the glass substrate. Because the mobility the carriers of a semiconductor is generally greater in polycrystalline materials compared to amorphous materials, it is beneficial to grow polycrystalline semiconductor layers on or over the glass substrate of the LCD display. For example, higher mobility carriers enable faster transistors for video applications. Alternatively, the higher mobility enables reduced feature-size transistors, which facilitates creation of higher aspect ratio displays.

In addition to the referenced benefits of fabricating polycrystalline materials and devices on a glass display surface, the creation of polycrystalline (e.g. polysilicon or 'poly') transistors on the glass display surface enables the creation of driver circuitry directly on the display, thereby eliminating the need for Tape Automated Bonding (TAB) connections and their attendant poor reliability. Moreover, if the display is based on organic light emitting devices (OLED'S), it is beneficial to incorporate poly transistors to supply the relatively high current requirements of the OLED's.

A significant drawback to growth of poly on glass substrates is the comparatively high temperatures the growth sequences require. While strides have been made to reduce the growth temperature of poly, it is often necessary to pre-anneal the glass substrate to thermally stabilize the glass for subsequent poly processing. This thermal processing, as well as other thermal processing can alter the physical structure of the glass. For example, the glass may expand or contract as a result of the processing.

One measure of the alteration of the glass by thermal processing is known as glass strain, which is known as compaction when negative and expansion when positive. The glass strain is proportional to the change in fictive temperature, which is the temperature of the glass when the molecular structure reaches a certain state of order. At high glass temperatures the fictive temperature equals the ordinary glass temperature because the glass is able to equilibrate very quickly with its ambient temperature. As the temperature is reduced, the glass viscosity rises exponentially with falling temperature and the speed of glass equilibration is dramatically reduced.

Thus, as the temperature is reduced, the glass "falls out of equilibrium" because of its inability to maintain equilibrium as the temperature changes. In this case the fictive temperature lags thermal temperature, and ultimately the fictive temperature 'stalls' at some higher temperature at which the glass no longer could equilibrate quickly enough to keep up with its cooling rate. The final fictive temperature will depend on how quickly the glass was cooled, and will typically be in the range of approximately 600° C. to approximately 800° C. for LCD substrate glass at room temperature.

As can be appreciated, therefore, the fictive temperature depends on the thermal history of the glass. As such, the compaction and expansion depends on the thermal history of the glass. The strain, which is proportional to the difference in the distance between two marks on a glass substrate before and after a heat treatment cycle divided by the distance before, must remain within a specified value that is set by the user. For example, in LCD display systems, the display substrate is normally required to have a glass strain having an absolute value of approximately 10 ppm, often a compaction level between approximately −10 ppm and approximately 0 ppm. Compaction values with magnitude greater than approximately 10 ppm can result in misalignment and mis-registration of overlapping patterns in an LCD display, resulting in image distortion, for example.

A significant problem remains to curb the glass strain in a glass substrate throughout its processing to the final product that implements the glass. For example, as referenced above, in applications where it is necessary to grow polycrystalline semiconductor materials on the glass using thermal treatments, the resultant compaction may be too great.

What is needed therefore is a method and apparatus that addresses the drawbacks of glass strain caused by thermal cycling in processing the glass.

SUMMARY

In accordance with an example embodiment, method of determining parameters of plurality of thermal cycles to achieve a set glass strain level includes providing a plurality of input parameters for a glass substrate and a plurality of parameters for a plurality of thermal cycles. The method also includes iteratively modifying at least one of the plurality of thermal cycle parameters so the glass strain is not greater than the set glass strain level after a final thermal cycle is completed.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

In the following detailed description, for purposes of explanation and not limitation, example embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

According to an example embodiment, a method of determining the parameters of the heating cycles used in growing polycrystalline materials so that maintaining a glass strain (e.g., compaction) of a glass substrate below a set value after a final thermal processing cycle includes determining a penalty function and performing a simulated annealing by iteratively varying at least one input processing parameter to minimize the penalty function. It is noted, however, that the methods of the example embodiments are applicable to other glass processing techniques and potentially other processing techniques where an optimization of a parameter is useful. As such, example embodiments useful in the growth of polycrystalline materials (e.g., silicon) described are intended to be illustrative and in no way limiting.

This penalty function is defined so as to return a small value when glass strain is within desired limits and a progressively larger value when glass strain approaches or exceeds desired limits. The penalty function may further include mathematical terms relating to desirable or less desirable processing conditions. For example, the penalty function may return a larger value for excessively high-temperature thermal processing cycles for the glass manufacturer, but lower values for more easily used lower temperatures. Further, the penalty function may return larger values for longer times of processing by the glass manufacturer (representing the greater cost of longer-time processing), and lower values for shorter processing times. A synonym for penalty function is "cost function". It is designed to best represent the cost of manufacturer processing and also the cost associated with glass that does not meet the spec for thermally-induced strain. The overall magnitude of the penalty function is relative; it is important that its minimum value represent a most desirable operating condition.

As will become clearer as the present description proceeds, the penalty function of the example embodiments is used to provide a way to compare among different choices of thermal processing. The comparison among these choices and the ultimate selection of a "best choice" or optimal process is performed using an iterative computer optimization algorithm such as simulated annealing.

As mentioned, it is useful to fabricate polycrystalline semiconductor materials over the glass. According to an example embodiment methods of choosing processing parameters to minimize glass strain are exceedingly useful in achieving this desired end. To this end, during the growth of polycrystalline material, the glass substrate undergoes certain thermal processing cycles before being sent to the manufacturer of an LCD display. The manufacturer grows a polysilicon layer on the glass substrate using known growth techniques which include rapid thermal annealing (RTA) for the activation of a doped silicon layer. To this end, the RTA allows dopants previously implanted in the polysilicon to thermally diffuse to relieve stress. The dopant activation step may occur at a relatively high temperature (e.g., approximately 600° C. to approximately 700° C.) and over a relatively short time interval (e.g., 1-3 min.). Depending on the actual conditions, this RTA can result in the compaction or the expansion of the glass, with the degree of glass strain dictated by the compaction conditions that occur during an initial heating cycle (C1) at the manufacturer.

It is noted that many of the example embodiments focus on the polysilicon growth sequence and incorporate three heating cycles. As can be readily appreciated by one of ordinary skill in the art, this is merely illustrative, and it is noted that heating/cooling cycles to attain other objectives beside polysilicon growth may be used, and fewer or more than three cycles may be used to meet the desired ends.

Figure 1A:
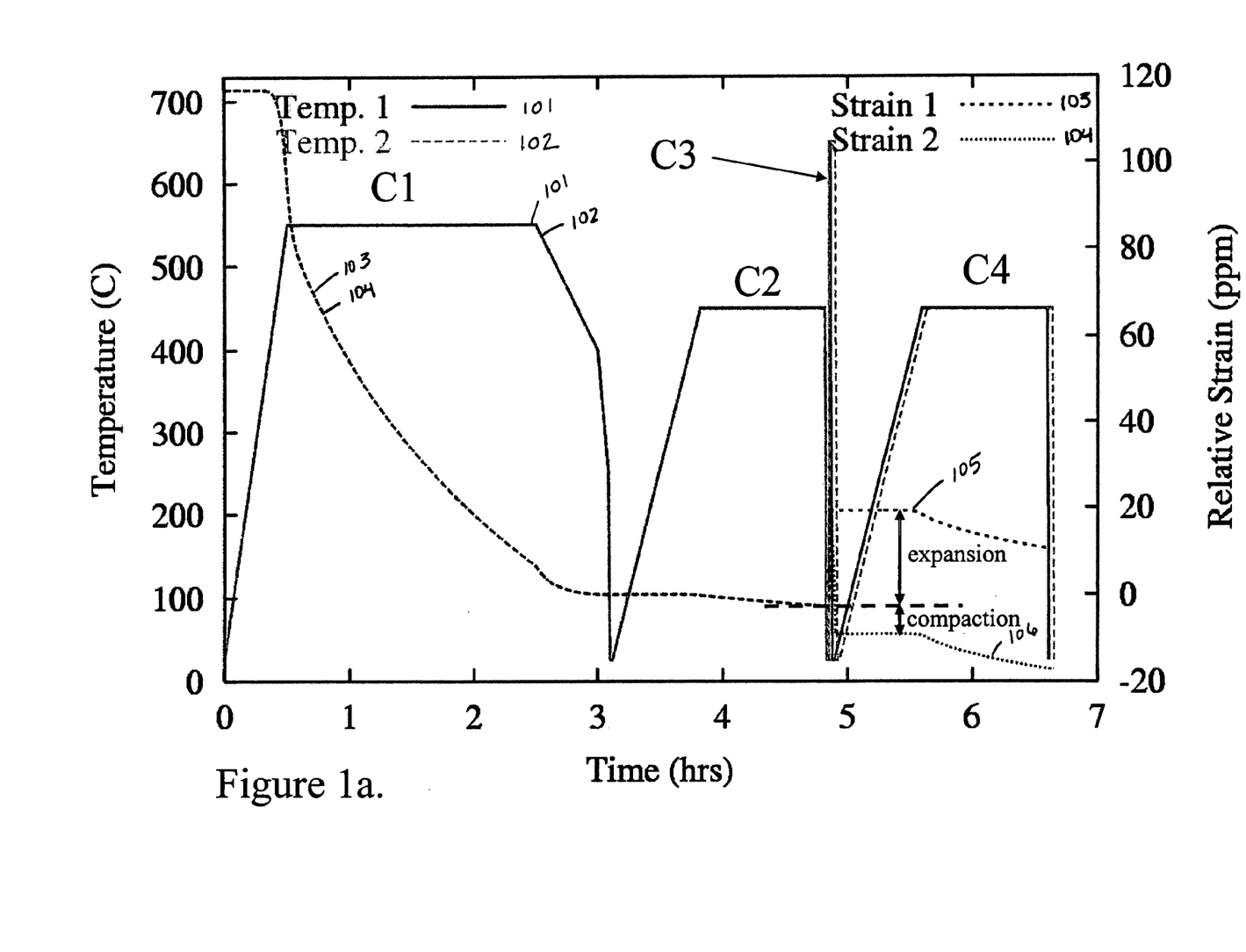
FIG. 1a is a graphical representation of the compaction versus time in accordance with an example embodiment.
Figure 1B:
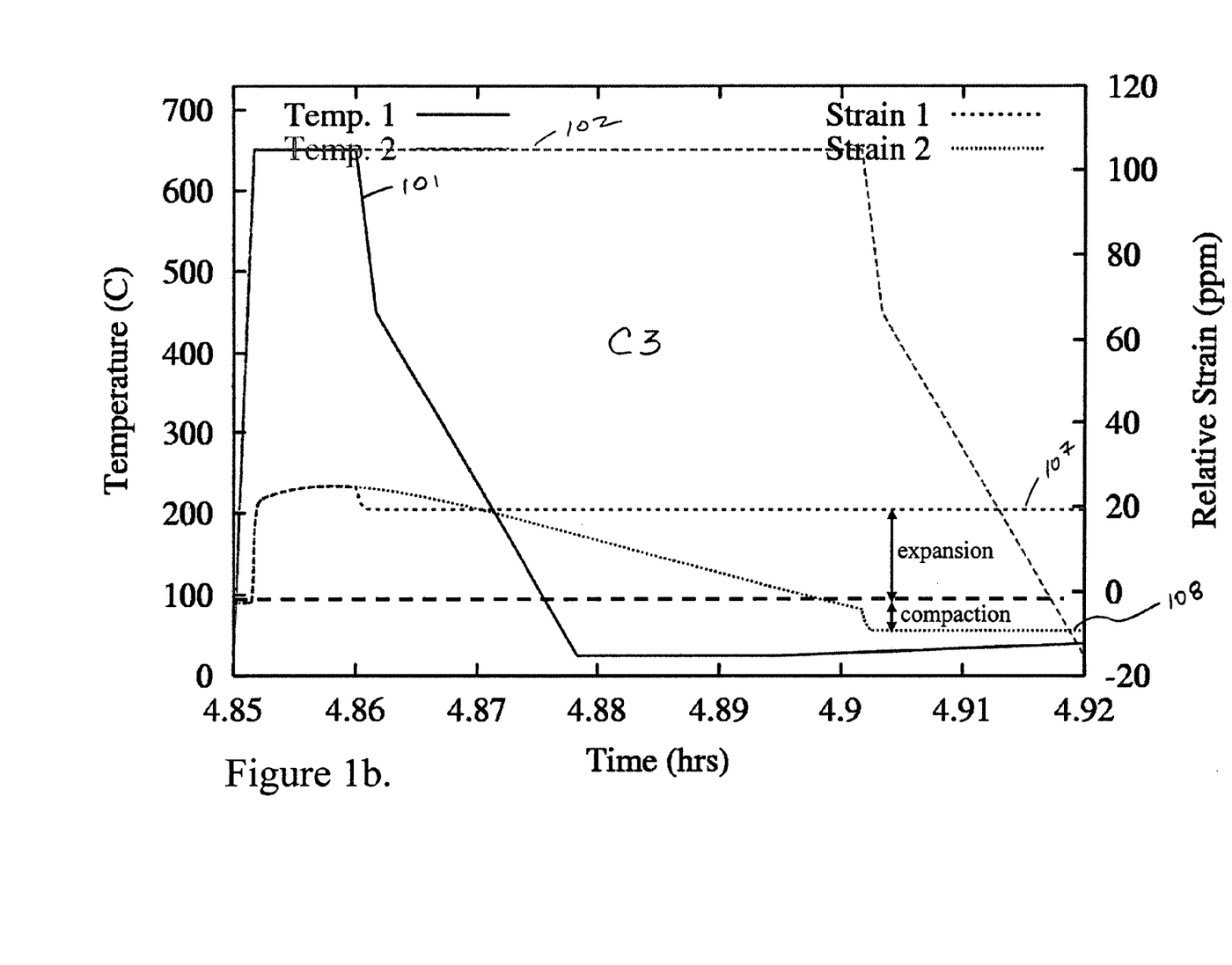
FIG. 1b is a graphical representation of the C3 thermal cycle of FIG. 1a shown on an expanded scale.

An example of the dependency of the compaction of the glass on the heating/anneal cycles is shown in FIGS. 1a and 1b, which show the compaction (in ppm) of a glass substrate as it undergoes three high temperature cycles (C2-C4) in poly Si growth on an LCD device substrate. These cycles follow a post anneal cycle (C1) at the glass substrate manufacturer. In FIG. 1a there are two sets of temperature cycles. A first curve 101 represents time (duration) and temperatures for the four thermal cycles, and is referred to as Temp 1. A second curve 102 represents time and temperatures for the four thermal cycles. These times and temperatures are different than those of the four cycles of curve 101 and is referred to as Temp 2. The difference in thermal cycles for this example is confined to the cycle denoted C3. A first glass strain 103 results from the time/temperature combinations of Temp 1. A second glass strain 104 results from the time/temperature combinations of Temp 2. As can be seen, the Temp 1 sequence results in a positive glass strain (expansion) 105 at the end of C3, while Temp 2 results in a negative glass strain (compaction) 106.

In order to more clearly illustrate the dependence of the time and temperature of the thermal cycles, thermal cycle C3 of FIG. 1a is shown in expanded form in FIG. 1b. First curve 101 is at approximately the same temperature as second curve 102, but drops during the cycle per the parameters set for this particular cycle. Second curve 102 on the other hand maintains the peak temperature for a longer period of time, before a cooling sequence is undertaken. The final strain for the cycle is also shown, with the Temp 1 cycle resulting in an expansion, and the Temp 2 cycle resulting in a compaction. The expansion of the substrate of the first curve 101 is on the order of approximately +19 ppm at the end of C3 as shown at 107, which is significantly greater than is acceptable in LCD applications. At the termination of the C3 cycle the compaction 108 is on the order of approximately −10 ppm.

One aspect of the behavior of the glass material shown in FIGS. 1a and 1b, is particularly noteworthy, and may be useful in modeling the behavior of the glass during thermal processing. While the glass undergoes significant compaction at 103 and 104, it is the change of the glass before and after thermal processing for example by display manufacturers that is important. In this example this means that compaction resulting from cycle C1 is of no importance, but compaction resulting from any of C2, C3, or C4 is important. It is found that maintaining the glass at a 'hold' state at a particular temperature, the relaxation in the glass results in a stabilized level of compaction/expansion that is within acceptable levels. In the example embodiment of FIG. 1a, the glass reaches a strain level at 105 and 106, which are an expansion and a compaction, respectively. The time dependent behavior of the glass material provides parametric data for the modeling of the material over time and temperature in order to optimize the glass strain, so that in the optimized case the final glass strain (e.g., at 105, 106) is within the required specification. The example cases of FIGS. 1a and 1b are repeated, but plotted with fictive temperature instead of strain, in FIGS. 3a and 3b, and FIGS. 4a and 4b, respectively.

As can be appreciated from the processing sequence of FIGS. 1a and 1b, the time and temperature of the processing sequence can impact the final glass strain. An example embodiment is drawn to a method of determining a penalty function for each set of process parameters (e.g., time and temperature) in order to determine a minimum of the penalty function, and thus the glass strain. As will become clearer as the present invention continues, these determinations of the penalty function are beneficially effected in an iterative manner using a computer or microcomputer. For example, an illustrative embodiment incorporates the details of the various fictive temperatures of the heating cycles of the poly Si growth, and iteratively determines how the parameters of one or more heating cycles may be altered to substantially optimize the expansion or compaction of the glass to within a prescribed level. This modeling method is described via example embodiments.

In carrying out the iterative method to substantially control the expansion or compaction of the glass within the prescribed level, the penalty function is defined to incorporate constraints on allowed temperature variations, heating and cooling rates, 'hold times', and durations of the various steps of each of the heating cycles. These constraints may be specified by the polycrystalline (e.g., poly Si) growth techniques, or the anneal sequence during the glass manufacture, or both. The illustrative method involves carrying out simulated anneal sequences by iteratively changing one or more of the input parameters of time, temperature, and rates of heating and cooling to determine the expansion or compaction of the glass, particularly during the polycrystalline growth.

The penalty function is minimized in a simulated annealing procedure or other iterative global optimization procedure in which all variable parameters (e.g., temperature and time) are varied in a controlled manner. From the simulated annealing, the effects of making certain changes to the post-anneal at the manufacturer as well as changes to the poly Si growth processes are analyzed to determine if any changes can be made to these variable parameters to reduce the glass strain to within the specified limit. A secondary goal is to select variable parameter values (i.e. processing conditions) that are more convenient in terms of cost, time, process stability, or other considerations. Moreover, with each iterative calculation, the associated penalty function is calculated, to determine if the chosen sequence is more favorable than previous choices. Finally, if during the calculation of a process sequence, minima of the penalty function are approached, the iterative calculation will search for the global minimum of the penalty function to optimize the expansion or compaction of the glass.

Certain iterative minimization processes/methods are known and may be applied to the search for a global optimal solution. An example method is simulated annealing technique, as described in "Global Optimization of Statistical Functions with Simulated Annealing," Goffe, Ferrier and Rogers, Journal of Econometrics, vol. 60, no. 1/2, January/February 1994, pp. C 65-100. The disclosure of this reference is specifically incorporated herein by reference. This method of simulated annealing is implemented in a Fortran program "simann.f" that is readily available.

For a chosen global optimization method to be effective, it is necessary that the penalty function described above be able to return values for any choice of processing parameters. Usually these parameters are the temperature and duration of thermal and other processing cycles for either the pretreatment by the glass manufacturer or times and temperatures used by glass customers during poly Si processing using the glass. The global minimum that may be found automatically by the methods of the example embodiments (such as simulated annealing). This gives the best possible set of processing parameters consistent with the chosen limits of those parameters (such as maximum allowed duration or temperatures) and consistent with the chosen definition of penalty function.

A method of optimizing the thermal cycles of a poly Si growth sequence to realize a glass strain at or below a specified level is described in conjunction with another example embodiment, which is presently described. Several fictive temperature components are needed to explain certain glass relaxational phenomena that are different depending on different thermal histories of the glass material. The role played by the exponential variation of glass viscosity with temperature, and the viscosity controlling the time dependence of glass properties, is addressed in example embodiments by scaling the time dependence proportional to inverse viscosity. This time rescaling is described in "Thermal Compaction Modeling of Corning Code 7059 Fusion Drawn Glass" to Walter M. Buehl, et al. 1991 SID International Symposium, Seminar and Exhibition (1991), the disclosure of which is specifically incorporated herein by reference.

The methods of example embodiments use constants and expressions described below to account for the properties of a given glass and its (room temperature) strain in response to thermal history. In accordance with an example embodiment, optimization of thermal cycles of the glass may be used to minimize and control thermal compaction (or expansion).

In order to optimize the thermal cycles, it is necessary to track fictive temperature dependence on thermal history. The viscosity of the glass (fluid), $\eta$, can be determined with the following expression:

$$\ln(\eta_L/\eta) = -A - B[x/T + (1-x)/T_f] \quad (1.1)$$

where $\eta_L$ is an arbitrary constant (for convenience to handle viscosity units), A, B, and x are constants that describe the glass under study, T is the current temperature and $T_f$ is the fictive temperature. The time variation of fictive temperature component i, $T_{fi}$, is given by:

$$\frac{dT_{fi}}{dt} = \alpha_i(T - T_{fi})\left(\frac{\eta_L}{\eta}\right) \quad (1.2)$$

where $(\eta_L/\eta)$ was described above and $\alpha_i$ is a parameter of the model and is related to the time rate of change of each fictive temperature component.

The fictive temperature is given as a weighted sum of the fictive temperature components using the expression:

$$T_f = \sum_{i=1}^{N} A_i T_{fi} \quad (1.3)$$

where there are N different fictive temperature components and each contributes with a weight $A_i$, which is an adjustable parameter of the model. The sum of the weights must add to unity, to wit:

$$\sum_{i=1}^{N} A_i = 1. \quad (1.4)$$

Finally, when the (room temperature) fictive temperatures before and after a given thermal process are known, the glass strain (usually called compaction) is given by the linear proportionality $$C = \beta(T_f^{after} - T_f^{before}) \quad (1.5)$$

where $\beta$ is a constant of proportionality, and $\alpha_i$ and $A_i$ for N values are determined per the above to describe relaxation behavior of fictive temperature components (N typically ranges from about 5 to 10), and $\beta$ is used to convert from fictive temperature to strain.

The constant of proportionality $\beta$ may be thought of in analogy to the coefficient of linear expansion for a material. The coefficient of linear expansion is a constant of proportionality between material strain and a change in temperature of the material. That is, if the temperature goes up by some amount, then the material expands by an amount proportional to this temperature change and also proportional to its original length. In a similar way, a glass will expand (or compact) by an amount proportional to both its change in fictive temperature and also proportional to its original length. The success of using a linear approximation to describe thermal expansion is well known, and the success of using the analogous linear approximation represented by $\beta$ is given in the Buehl reference.

In addition to parameters related to the glass, there are constants that describe the initial processing of the glass. This description is given by a set of data points (time, temperature) that represent the thermal history of the glass during its manufacture. The initial values of the fictive temperature components (at the initial time) are taken to be equal to the temperature of the glass at its highest temperature during forming. At this temperature the viscosity is so low that the time relaxation is essentially instantaneous, or in other words, each fictive temperature component becomes equal to the actual glass temperature.

As the glass temperature is reduced during processing, the slowest-relaxing fictive temperature components (those of smallest $\alpha_i$) will lag the changing temperature, and the overall fictive temperature given by Eq. 1.3 will no longer equal the glass temperature. Thus, by the time the glass is manufactured and has cooled to room temperature, its manufactured fictive temperature is much higher than room temperature and may be in the range of approximately 600° C. to approximately 900° C.

The fictive temperature components, $T_{fi}$, along with the parameters of the model referenced above, fully track the thermal history of the glass within this model. That is, some description of processing history is used to calculate $T_{fi}$ and these are the starting values for any subsequent thermal processing of the glass. In each case the time evolution of the fictive temperature components is calculated while the real temperature is varying with time, and the compaction after any given process is calculated using Eq. 1.5.

The only remaining information needed to run predictive simulations or to run optimizations is a (time, temperature) description for thermal processing steps subsequent to glass manufacture. These steps are handled as described above, with the starting values of the fictive temperature components always taken as the ending values from the previous process.

Figure 2:
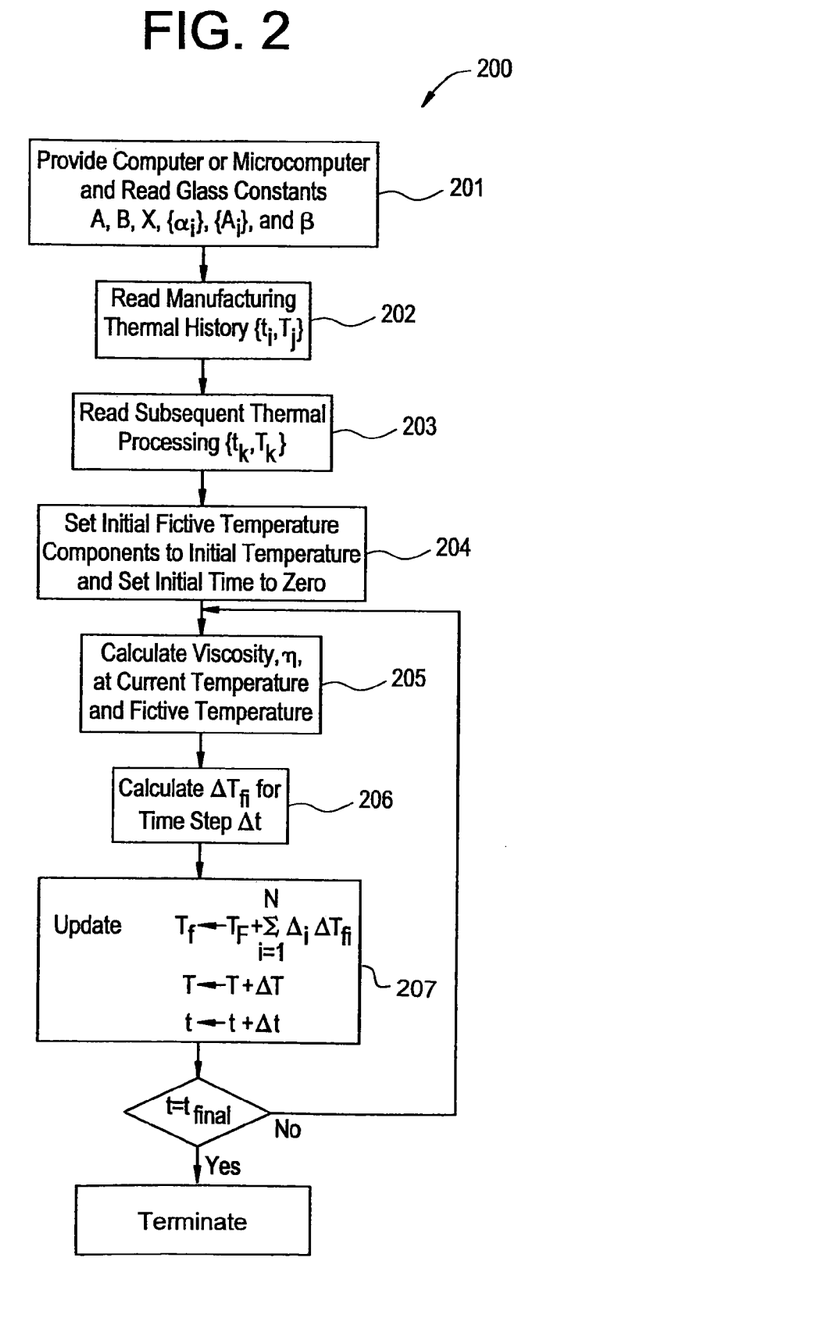
FIG. 2 is a flow chart showing a single fictive temperature (and strain) prediction versus time, for a single choice of glass material parameters and thermal processing parameters.

FIG. 2 shows a predictive calculation of an example embodiment for a single choice of (time, temperature) values; that is a single case representing both glass manufacturing thermal history (202) and subsequent thermal processing (203). Note that the subsequent thermal processing may include both glass manufacturer thermal treatments and customer thermal cycles, e.g. associated with poly Si crystallization. The entire process given in FIG. 2 is needed to predict the overall fictive temperature variations before and after the customer processing steps, and thereby to predict the success or failure of the glass to satisfy customer strain (compaction) requirements, for a single choice of thermal processing conditions.

The fictive temperature values that occur before and after a glass manufacturer's customer's (e.g., display manufacturer) processing steps are used in an expression like Eq. (1.5) to calculate predicted glass strain. The resulting strain values are then used to calculate contributions to the penalty function within the global iterative optimization. Thus, a global iterative optimization (such as with simulated annealing) will automatically input on the order of approximately $1 \times 10^3$ to on the order of approximately $1 \times 10^6$ values for all variable parameters describing (time, temperature) process conditions. For each of these thousands to hundreds of thousands of cases, the procedure of the example embodiment of FIG. 2 will be employed to calculate fictive temperatures, glass strains, and the penalty function. One important part of this method is the robust prediction of strains in a way that can be automated on the computer and used in the context of global optimization of the process conditions.

At step 201, a computer or microcomputer is provided and the requisite glass constants A, B, x, $\{\alpha_i\}$, $\{A_i\}$ and $\beta$ are input to the computer and stored for later use. The computer or microcomputer may be one of a variety of devices well-known to one of ordinary skill in the art. For example, a personal computer (PC) may be used in this capacity. Similarly, the thermal history during manufacturing of the glass is input as ordered pairs of time and temperature at step 202. These data relate to the fabrication of the glass and not the subsequent processing of the substrate for the fabrication of polycrystalline layers on the glass. Thereafter, at Step 203, the subsequent thermal history, again in ordered pairs of time and temperature is input to the computer as well. These data relate to the thermal cycles imposed by the glass manufacturer and also the thermal cycles required for polycrystalline growth techniques. Ordinarily, these data that are the input values of step 203 are the primary degrees of freedom being optimized in the global optimization. Further, it is ordinarily the thermal processing by the glass manufacturer that is mainly the subject of optimization, given that customer processing of poly Si has limited freedom for adjusting its thermal cycles. When global optimization is described herein by simulated annealing or by other methods, an iterative method such as the computer-based iterative procedure for finding the best choice of the time and temperature values that occur in step 203. As global optimization proceeds, a subset of the input values of step 203 is varied and the method of FIG. 2 is applied for every such variation.

Next, at step 204, the initial values of the fictive temperature components are set to the highest temperature that occurs during glass manufacture, and the initial time is set to zero. Alternatively, the time evolution described in subsequent steps can be carried up to the point just before the first of the 'subsequent thermal processing' step of step 203, and the resulting fictive temperature components can be used as inputs for the repeated calculations described above during global optimization. In this case, instead of following the time evolution of fictive temperature components from glass manufacture up to just before subsequent thermal processing, the thermal history associated with glass manufacture is replaced by the resulting fictive temperature components. This makes the computer calculations faster when many thousands of similar calculations must be performed during global optimization. From the data input, and from Eq. 1.1, the viscosity of the glass at the current temperature and fictive temperature are calculated at step 205. Next, for an incremental step in time, the change in the fictive temperature is calculated at step 206. This calculation is carried out via the differential of the fictive temperature via a straight-forward manipulation of Eq. 1.2. At step 207, the various values for the fictive temperature, temperature and time are updated for the thermal sequence.

If, at the end of step 207, the time equals the final time in the cycle, the final fictive temperature and the glass strain associated are provided, with the fictive temperature being the sum of the individual weighted components from Eq. 1.3, and the strain from Eq. 1.5. If the cycle is not completed, the method is repeated beginning with step 205. When one cycle is completed (i.e. the simulated time reaches the ending time of that cycle), the calculation simply proceeds on in time into the next cycle, and so on until all cycles are completed. The known times of starting and stopping each cycle are then used to select the overall fictive temperatures before and after each cycle, and their differences are used to compute the related glass strains (compactions) using Eq. (1.5 ).

In a separate iterative process, designed to define the initial glass constants of step 201, the input parameters of step 201 are adjusted in a least squares sense to minimize the error in model predicted compaction versus measured compaction. The measured compaction values are acquired by observing the change in length between two thin scribed lines on a sample before and after undergoing a given thermal treatment. The strain values are the length change divided by initial length. This procedure is done once for a given glass and given manufacturing method. It is not necessary to adjust the constants of step 201 when thermal processing is varied, but these constants will be different for different glass compositions and different manufacturing processes (other than different subsequent thermal cycles). In this model-defining procedure, another optimization such as described above is employed, with repeated application of FIG. 2, but this time the glass constants of step 201 are varied instead of the thermal processing of step 203. The thermal processing of step 203 in this case is defined by actual laboratory thermal cycles for which strain measurements have been performed and are available for comparison.

From the illustrative iterative method of FIG. 2 and the descriptions given above, the various input parameters for each of the thermal cycles in glass post-annealing and polycrystalline growth techniques are readily determined to achieve the desired growth, while maintaining the glass strain below a prescribed level. An example of the processing realized through a simulated anneal are described in connection with FIGS. 3a-5b.

Figure 3A:
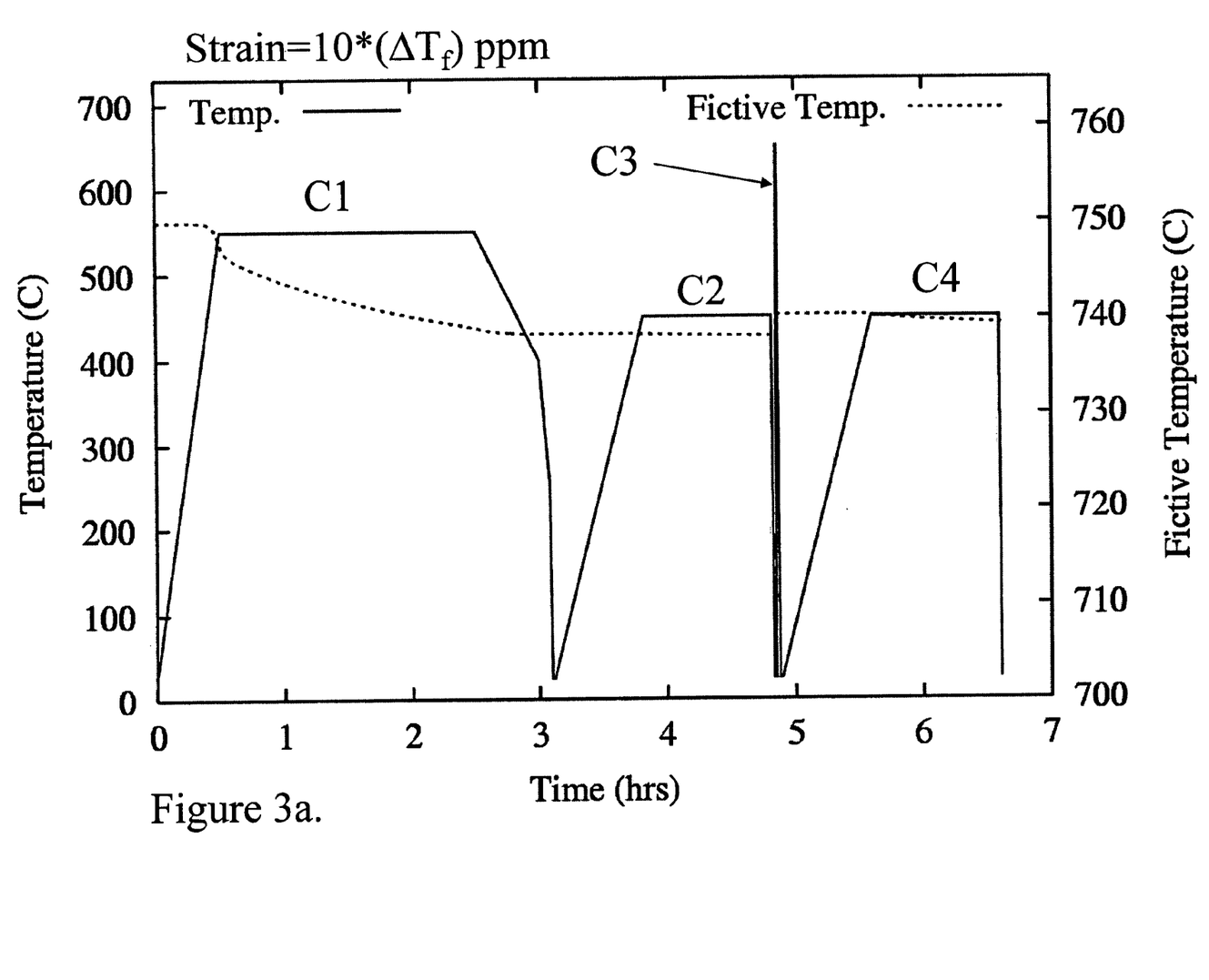
FIG. 3a is a graphical representation showing temperature versus time and fictive temperature versus time for a multi-thermal cycle process in accordance with an example embodiment.
Figure 3B:
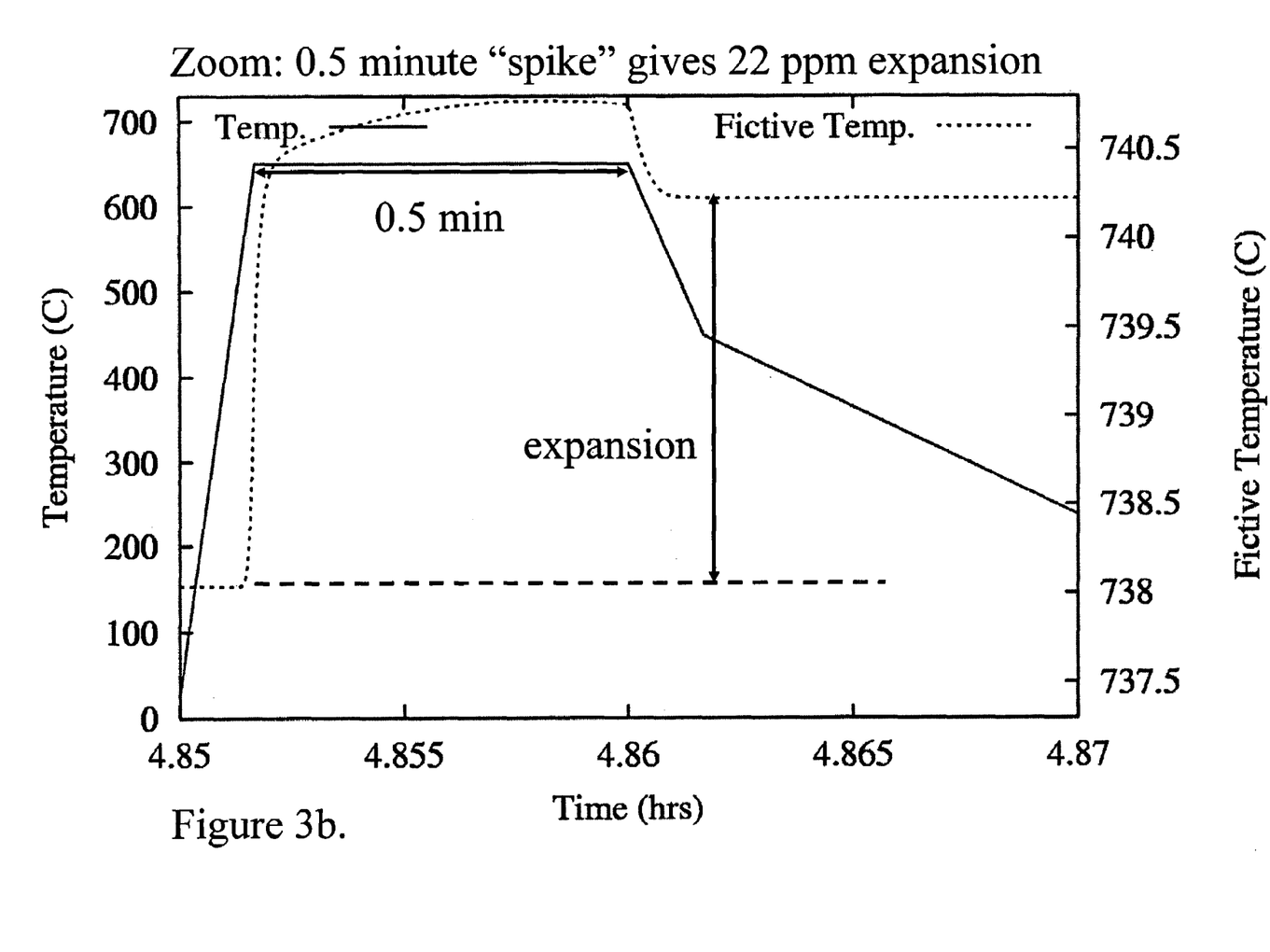
FIG. 3b is a graphical representation showing temperature versus time and fictive temperature versus time for one of the thermal cycles of FIG. 3a in accordance with an example embodiment.
Figure 4A:
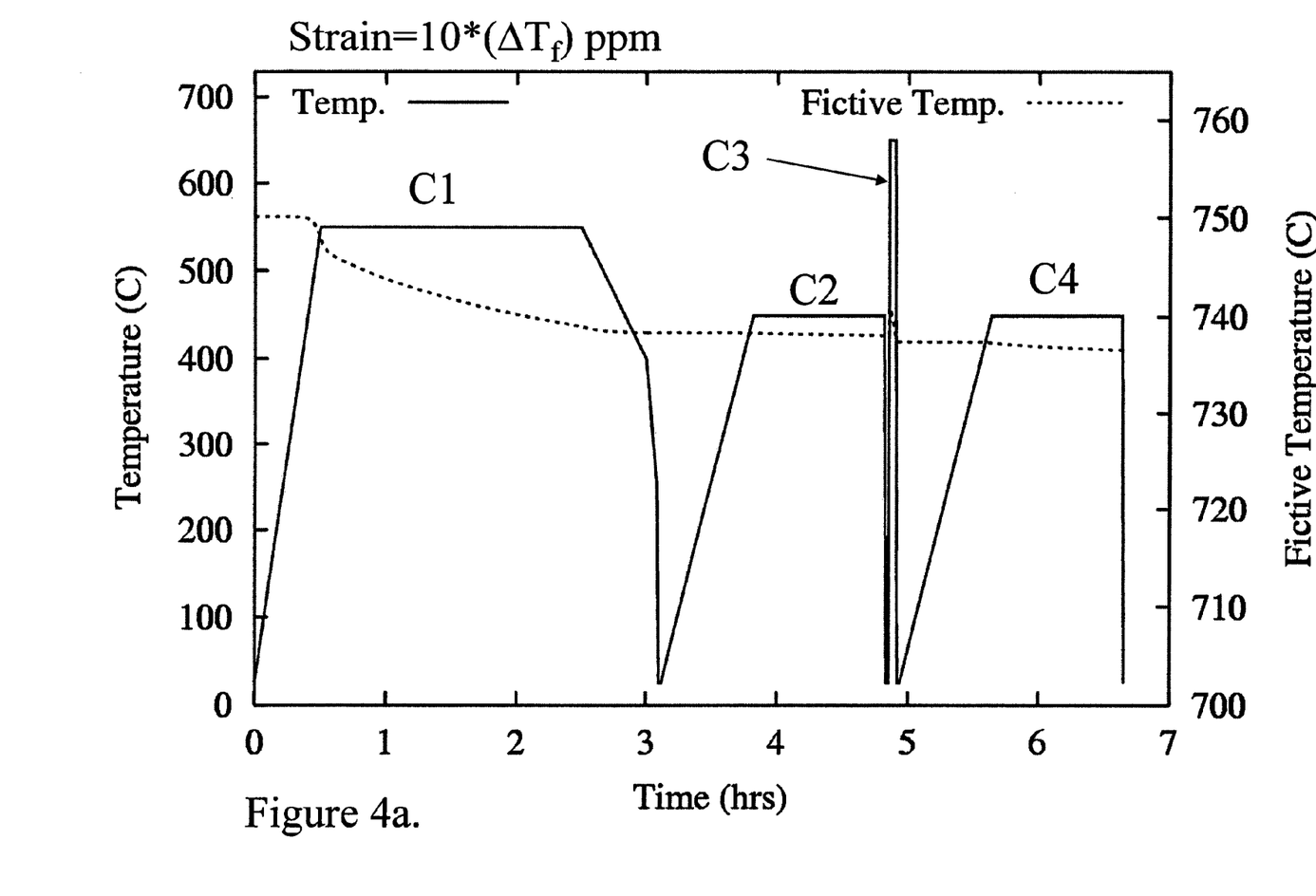
FIG. 4a is a graphical representation showing temperature versus time and fictive temperature versus time for a multi-thermal cycle process in accordance with an example embodiment.
Figure 4B:
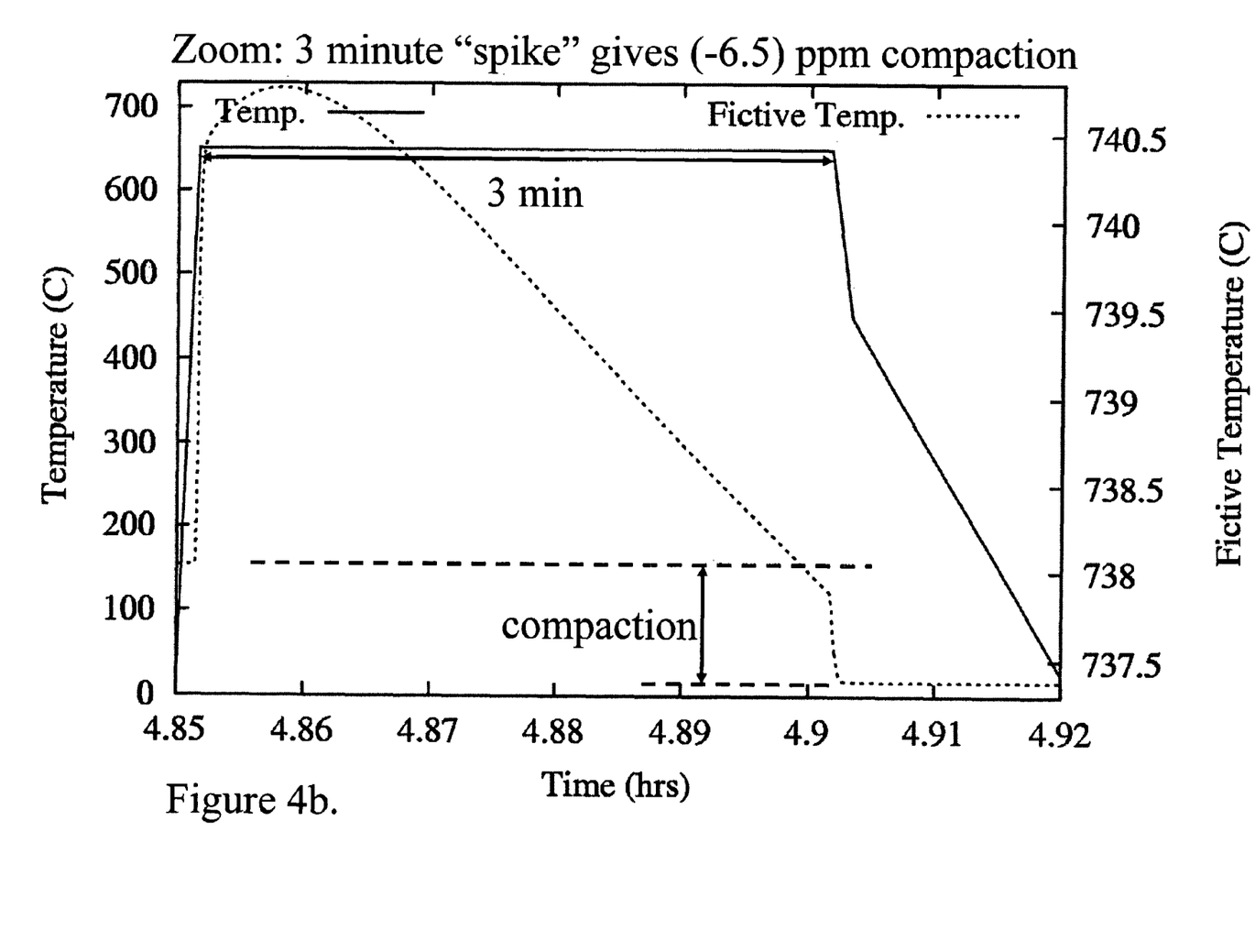
FIG. 4b is a graphical representation showing temperature versus time and fictive temperature versus time for one of the thermal cycles of FIG. 4a in accordance with an example embodiment.
Figure 5A:
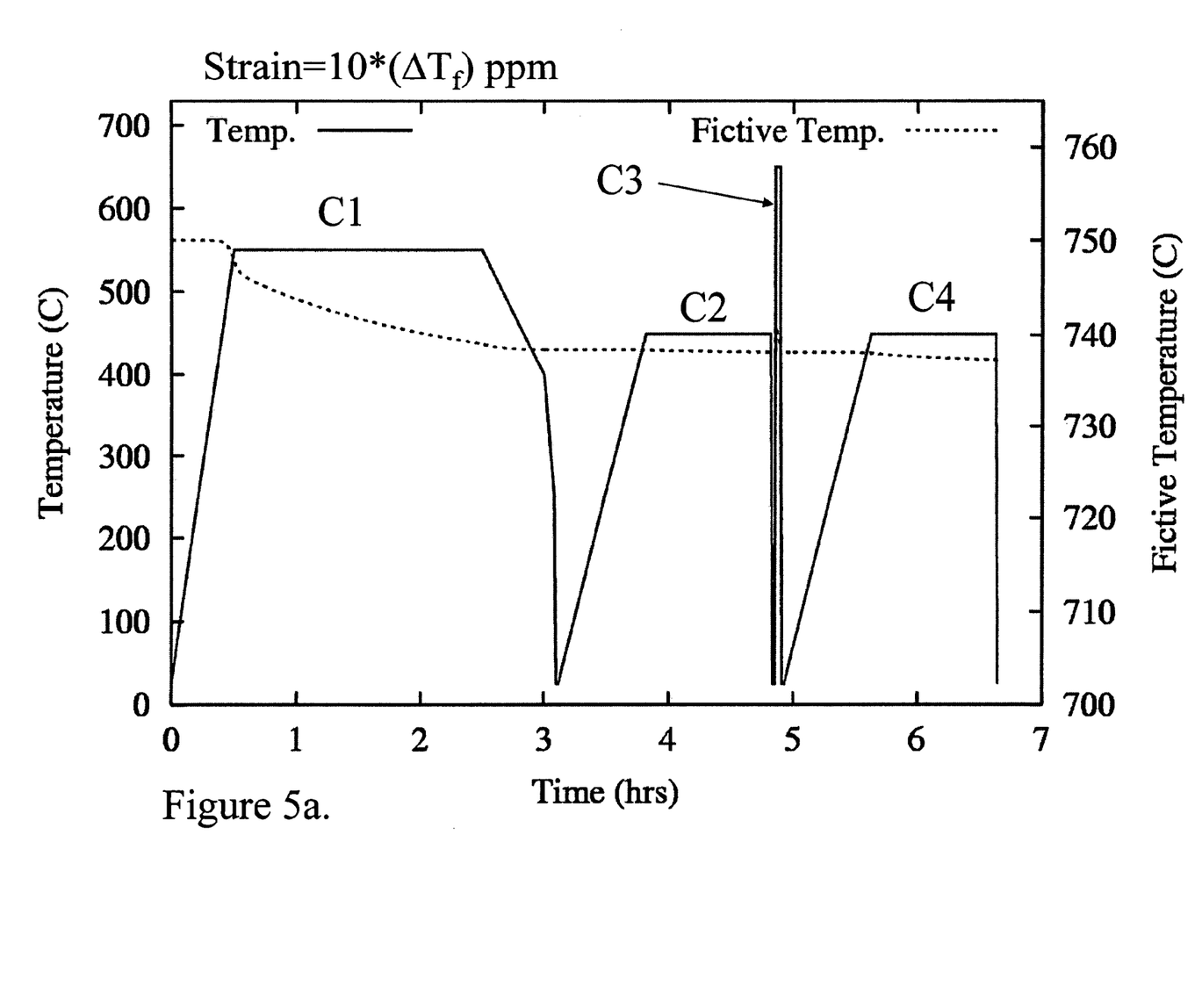
FIG. 5a is a graphical representation showing temperature versus time and fictive temperature versus time for a multi-thermal cycle process in accordance with an example embodiment.
Figure 5B:
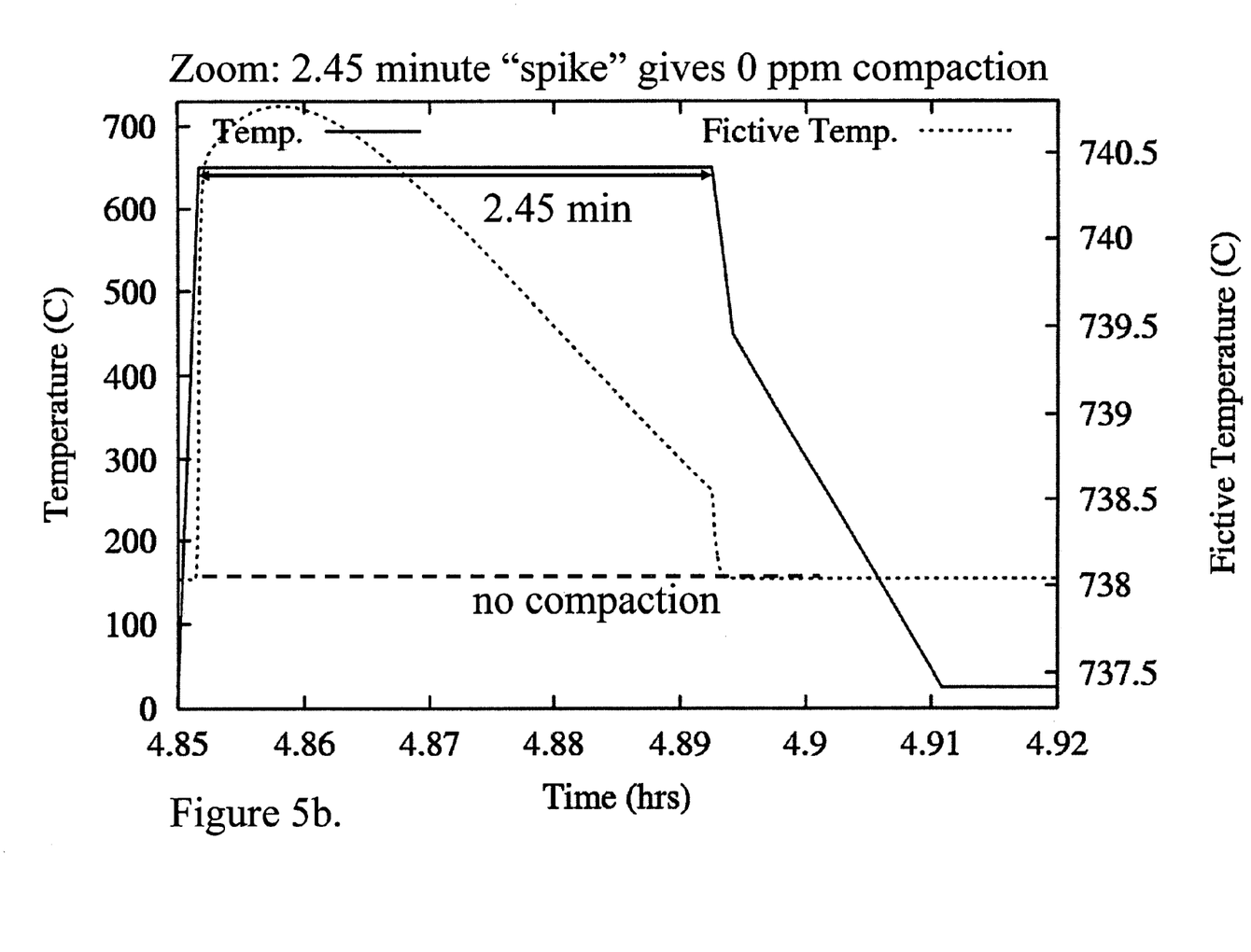
FIG. 5b is a graphical representation showing temperature versus time and fictive temperature versus time for one of the thermal cycles of FIG. 5a in accordance with an example embodiment.

FIGS. 3a-5b show an example of optimizing a C3 cycle by slightly extending it, and highlights strong time-dependent effect of expansion followed by compaction. FIG. 3a shows four thermal cycles C1-C4. The various parameters are varied in accordance with the example embodiments described above for the third thermal cycle of a glass sample, C3. FIGS. 3b, 4b and 5b show the C3 cycles for certain parameters. It is noted that for a C3 hold time in the range of 0.3 min. to 3.45 min, C4 compaction stays very close to −8.5 ppm and decreases slightly with longer C3 hold. C2 is of course unaffected.

FIG. 3b shows the C3 cycle in magnified view. In C3 heating cycle 300, the hold time at the final anneal temperature is on the order of approximately 0.5 min. In this example, the fictive temperature is on the right ordinate, and from the calculation provided by Eq. 1.5, the glass strain is calculated. In the present example there is a significant degree of expansion. This is the same expansion example as was depicted in FIGS. 1a and 1b, denoted Temp 1.

In FIG. 4a, the four thermal cycles C1-C4 are shown. FIG. 4b shows the C3 thermal cycle in magnified view and reveals an acceptable degree of compaction (6.5 ppm) realized by providing a hold time of approximately 3.0 min. This is the same compaction example as was depicted in FIGS. 1a and 1b, denoted Temp 2. With the pair of examples of FIGS. 3a, 3b and FIGS. 4a, 4b we show hold times for C3 that bracket the most optimal case of zero strain for C3.

Finally, FIG. 5a shows the four thermal cycles C1-C4 using yet other choice of parameters. The C3 cycle is shown in magnified view in FIG. 5b. In this method, the compaction is substantially zero, with the hold time of 2.45 min.

From FIGS. 3a-5b, advantages of the simulated anneal sequence provided by the example methods described above show that, depending on the restraints of the post-anneal polycrystalline growth techniques, certain variations in these processing cycles can provide significant benefits in the final product. It is exceedingly valuable to try adjustments in both manufacturer and customer thermal cycles on the computer, conveniently and cheaply, rather than trying them in the laboratory. The use of global optimization such as simulated annealing can show where a practical manufacturer thermal cycle may not be able to prevent the glass from having excessive strain in a certain customer process, whereas a small adjustment of that process can recover an acceptable strain. Such an example was given above in which a small change in heating time can bring the glass from excessive expansion to nearly zero expansion or compaction.

It is noted that the example embodiments usefully enables a user to determine from the material parameters and processing sequences of the glass manufacturer and further entities that may further process the glass (e.g., the glass manufacturer's customers) whether a particular glass strain can be achieved; and if not the example embodiments allows the manufacturer to calculate changes in the customers' processes to meet the desired glass strain. (Of course, this assumes the limits of the glass manufacturer's processes are exhausted and the required glass strain requirements are not met.)

The example embodiments having been described in detail in connection through a discussion of exemplary embodiments, it is clear that modifications of the invention will be apparent to one having ordinary skill in the art having had the benefit of the present disclosure. Such modifications and variations are included in the scope of the appended claims.

The invention claimed is:

1. A method of setting a glass strain level, the method comprising:

a.) obtaining a set of glass constants;
b.) obtaining glass manufacturing thermal history parameters;
c.) obtaining a set of subsequent thermal processing parameters;
d.) setting a set of initial fictive temperature components to an initial temperature value;
e.) calculating a value of viscosity at a current temperature and a current fictive temperature;
f.) calculating a change in the fictive temperature for a given change in time;
g.) updating a set of data including the current temperature and the current time, and storing these data;
h.) determining if the current time from step g.) is a set final time, and if not repeating steps e.) through h.), and if so, terminating the method.

2. A method as recited in claim 1, the method further comprising:
   i) calculating a penalty function, returning to step c) and obtaining another set of thermal processing parameters; and
   repeating steps d) through i) for the new thermal processing parameters.

3. A method as recited in claim 2, wherein the step i) is repeated up to $10^6$ times.

4. A method as recited in claim 2, wherein step i) is repeated for approximately $10^3$ to approximately $10^6$ thermal history parameters and thermal processing parameters.

5. A method as recited in claim 1, wherein the glass manufacturing thermal history is input to a microcomputer as ordered pairs of time and temperature.

6. A method as recited in claim 1, wherein the subsequent thermal history is input to a computer as ordered pairs of time and temperature.

7. A method as recited in claim 1, wherein the initial fictive temperature is set to the highest temperature that occurs during glass manufacture.

8. A method as recited in claim 1, wherein the glass strain is given by:

$$C=\beta(T_f^{after}-T_f^{before})$$

where, C is the glass strain, $\beta$ is a constant of proportionality, and $T_f^{after}$ and $T_f^{before}$ are the fictive temperatures at an end and at the beginning of a thermal process, respectively.

9. A method as recited in claim 8, wherein the fictive temperatures at the end and beginning as determined by:

$$T_f = \sum_{i=1}^{N} A_i T_{fi}$$

where there are N fictive temperature components and each contributes with a weight $A_i$, which is an adjustable parameter.

* * * * *